United States Patent [19]
Bergervoet et al.

[11] Patent Number: 6,138,519
[45] Date of Patent: Oct. 31, 2000

[54] FLOW GUIDE FOR A TURBINE WHEEL GAS METER

[75] Inventors: Josephus Theodorus Maria Bergervoet, Terborg; Franciscus Johannes Gerardus Maria Oostendorp, Ulft, both of Netherlands

[73] Assignee: Instromet B.V., Silvolde, Netherlands

[21] Appl. No.: 09/194,558

[22] PCT Filed: Jul. 18, 1997

[86] PCT No.: PCT/NL97/00429

§ 371 Date: Nov. 25, 1998

§ 102(e) Date: Nov. 25, 1998

[87] PCT Pub. No.: WO98/04887

PCT Pub. Date: Feb. 5, 1998

[30] Foreign Application Priority Data

Jul. 26, 1996 [NL] Netherlands ............................ 1003690

[51] Int. Cl.$^7$ ...................................................... G01F 1/05
[52] U.S. Cl. ........................................................ 73/861.79
[58] Field of Search ............................. 73/861.79, 861.75, 73/861.77, 861.78, 861.83; 138/37, 40, 44

[56] References Cited

U.S. PATENT DOCUMENTS

| | | | |
|---|---|---|---|
| 2,343,560 | 3/1944 | Klein et al. ................................. | 138/37 |
| 3,519,024 | 7/1970 | Johnson et al. ............................. | 138/41 |
| 3,572,391 | 3/1971 | Hirsch ........................................ | 138/37 |
| 4,308,755 | 1/1982 | Millar et al. ........................... | 73/861.77 |
| 5,341,848 | 8/1994 | Laws .......................................... | 138/44 |
| 5,596,152 | 1/1997 | Bergervoet et al. .................. | 73/861.63 |
| 5,922,970 | 7/1999 | Ohle ..................................... | 73/861.22 |

FOREIGN PATENT DOCUMENTS

| | | |
|---|---|---|
| 2218553 | 9/1974 | France . |
| 2483605 | 12/1981 | France . |
| 2717536 | 9/1995 | France . |
| 203293 | 4/1907 | Germany . |
| 9505581 | 2/1995 | WIPO . |

*Primary Examiner*—Harshad Patel
*Attorney, Agent, or Firm*—Ladas & Parry

[57] ABSTRACT

A device for measuring flow rate of a gas in a pipe includes a flow guide for eliminating eddies from the gas flow at a distance upstream of a turbine wheel gas meter which at the side facing the flow guide is provided with a blunt, rounded nose part. The flow guide has at least one dividing wall which is concentric with the inside wall of the pipe and a number of uniformly distributed radial dividing walls extending on both sides of the circumferential dividing wall. The dividing walls define flow apertures which are of quadrangular form and are substantially equal throughout the flow guide. The flow apertures are arranged in a plurality of circumferential rows in the flow guide.

10 Claims, 3 Drawing Sheets

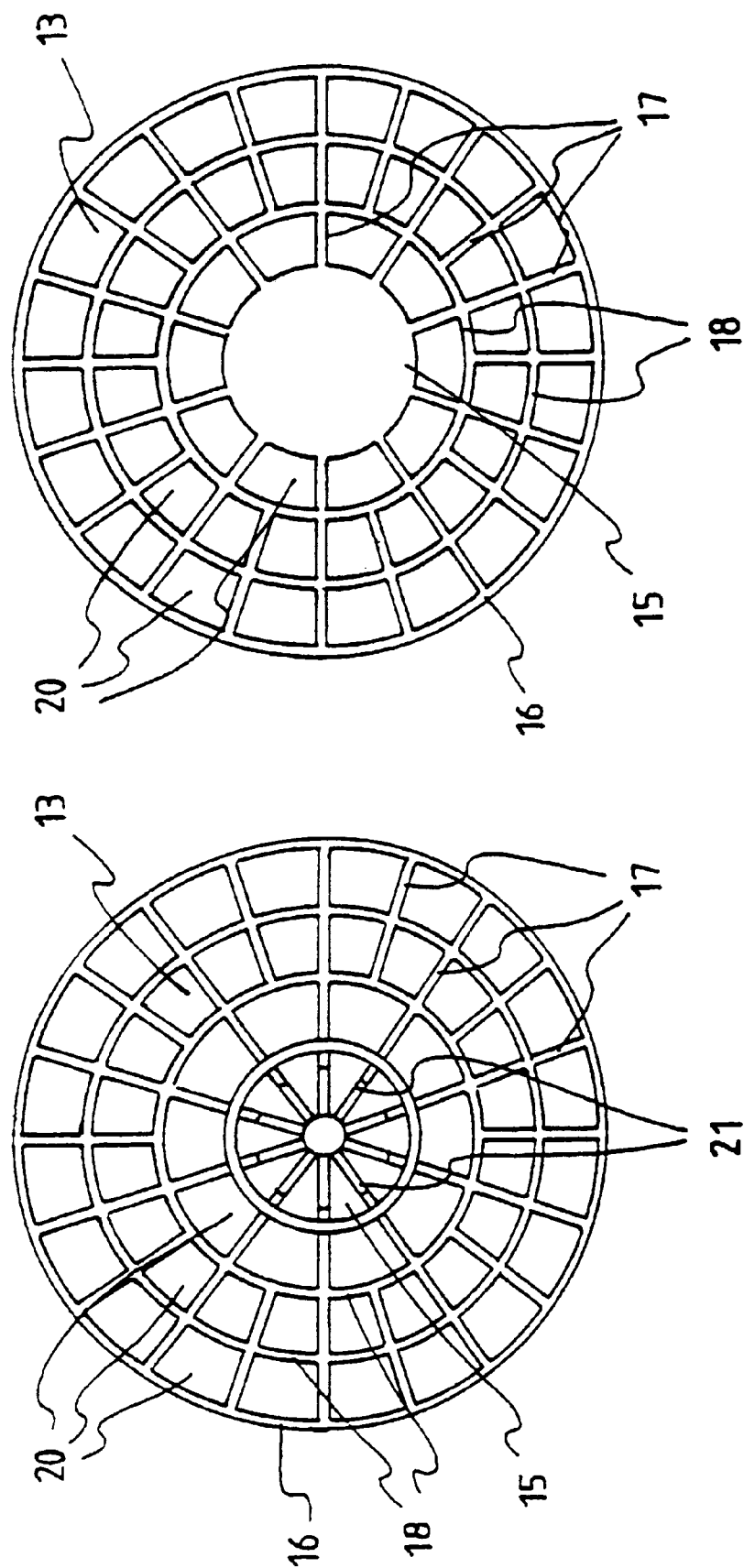

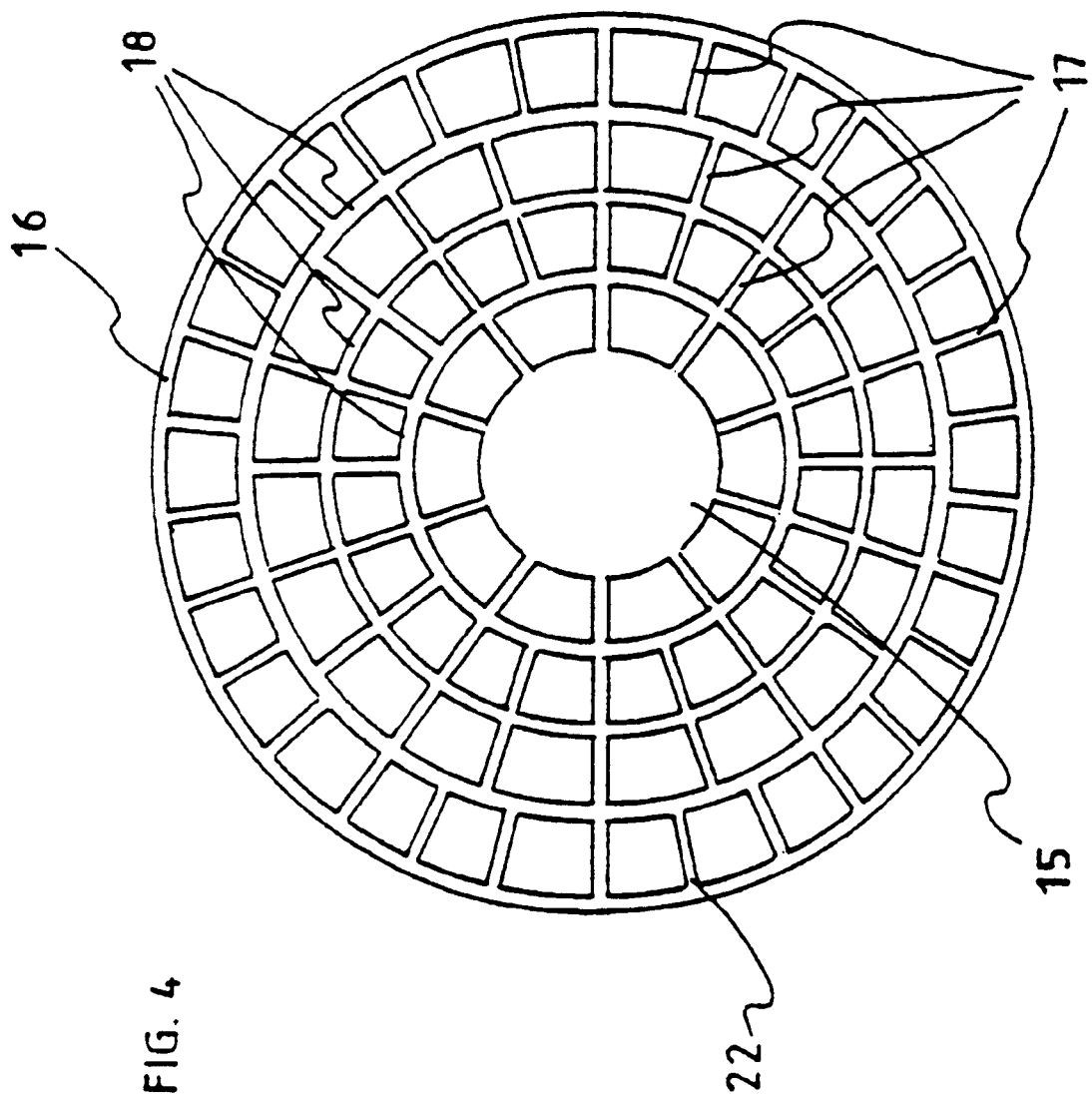

FLOW GUIDE FOR A TURBINE WHEEL GAS METER

FIELD OF THE INVENTION

The invention relates to a flow guide for eliminating eddies from a gas flow in a pipe at a distance upstream of a turbine wheel gas meter which at the side facing the flow guide is provided with a blunt, rounded nose part. The invention also relates to a device for measuring the flow rate of a gas flow in a pipe, consisting of a turbine wheel gas meter to be placed in the pipe and a flow guide which is placed upstream relative to the turbine wheel gas meter, at a distance from the turbine wheel gas meter, at the side facing the flow guide the turbine wheel gas meter being provided with a blunt, rounded nose part.

BACKGROUND AND PRIOR ART

Such a flow guide and such a device are known from Dutch Patent Application NL-A-9400445. The turbine wheel gas meter of this known device consists of a circular symmetrical element which is mounted in the pipe by means of spokes. The gas flow is guided along the upstream blunt, rounded nose part of the turbine wheel gas meter to the annular gap between the central element and the inside wall of the flow pipe. A blade wheel is mounted in the turbine wheel gas meter in such a way that the blades are situated in the annular gap. The blade wheel is driven by the gas flowing through the annular gap. The flow guide is placed at a distance upstream of the nose part, which flow guide in the case of this known device consists of a plate in which a circular symmetrical hole pattern has been made. The flow guide eliminates the eddies in the gas flow. These eddies occur when there are obstacles in the gas pipe, for example at bends, transitions to other pipe diameters or at fittings. After passing through the flow guide, the gas flow is homogenized by radial impulse exchange in the space between the flow guide and the nose part, so that a homogenous or uniform flow profile is produced in the annular gap between the pipe wall and the turbine wheel gas meter. This homogenous flow profile is necessary to permit accurate measurements to be carried out by means of the turbine wheel gas meter. For that purpose, the nose part must be a rounded, slightly blunt shape which is not streamlined, so that sufficient impulse exchange with the gas flow occurs.

However, the pressure loss in the case of this known device is relatively great. This is a disadvantage in particular in circumstances in which not much pressure is available, as in the case of low-pressure systems. This pressure loss is also a disadvantage if the gas is being compressed again after it passes through the turbine wheel gas meter. The compression costs are higher because of the pressure loss which has occurred.

Other known flow guides were designed in the first instance for use in the case of orifice meters instead of in turbine wheel gas meters. For this, the flow guide not only has to eliminate eddies, but also to give a flow profile which within certain margins of error corresponds to a fully developed flow profile such as that which would occur at the end of a very long pipeline. The flow profile needed for an orifice meter has to be a very specific shape. The flow guides needed for this of necessity produce a relatively high pressure loss.

SUMMARY OF THE INVENTION

The object of the invention is to provide a flow guide for a turbine wheel gas meter, which flow guide can eliminate eddies in a gas flow with the least possible pressure loss, the flow being directed in such a way that the flow has a substantially circular symmetrical profile.

This object of the invention is achieved by the fact that the flow guide comprises at least one dividing wall which is substantially concentric with the inside wall of the pipe, a number of uniformly distributed radial dividing walls being provided on both sides of the concentric dividing wall. This means that the open surface through which the gas can flow is at a maximum, so that the pressure loss is minimal. While in the known flow guides, consisting of a plate with circular holes, the total throughflow aperture is approximately 50 to 60% of the surface area of the cross-section of the pipe, the net throughflow aperture in the case of a flow guide according to the invention is at least 80 to 90% of the cross-section surface area of the pipe. It has been found that at low pressures the eddies in a gas flow are eliminated satisfactorily.

U.S. Pat. No. 4,308,755 discloses a flow guide which is placed upstream of a turbine wheel gas meter and consists of a number of radial dividing walls which converge in the center. Said flow guide is intended for directing a liquid flow and is not suitable for eliminating eddies from a gas flow. The turbine wheel gas meter is placed at a short distance behind this known flow guide, and it is not provided with a blunt nose part. Owing to the absence of the nose part and the short distance between the flow guide and the turbine wheel gas meter, no radial impulse exchange, which also makes the flow homogeneous, occurs. This known flow guide is also not provided with a concentric dividing wall. The throughflow aperture is consequently divided into cake-wedge-shaped apertures. Said apertures cannot eliminate the eddies in a gas flow sufficiently, and besides they cause additional eddies. If this known flow guide were used for the elimination of eddies from a gas flow, the flow guide would have to be made very long, which would result in an impracticable length and great pressure loss.

In a preferred embodiment the flow guide comprises an outermost concentric wall with substantially the same periphery as the inside wall of the pipe. This means that the flow guide connects well to the inside wall of the pipe and can be fixed easily in the pipe. The flow guide must be placed in a well-fitting manner in the pipe, so that no appreciable flow which bypasses the flow guide may occur. In order to make positioning and fixing of the flow guide in the pipe even easier, the outermost concentric wall is preferably longer in the axial direction than the dividing walls of the flow guide.

The flow guide preferably comprises a substantially circular central part, the diameter of which is approximately one quarter of the periphery of the flow guide, the flow guide comprising two concentric dividing walls, and the distance between the concentric dividing walls being approximately equal to the distance between the innermost concentric wall and the central part, and also being approximately equal to the distance between the outermost concentric dividing wall and the outer periphery of the flow guide. This produces a uniform distribution of the radial and concentric dividing walls, with the result that the eddies are already efficiently eliminated by the radial dividing walls when the flow guide is of relatively short length in the axial direction. The pressure loss remains very limited by the small number of walls and the large net throughflow aperture.

The number of radial dividing walls between the central part and the innermost concentric wall is preferably half the number of radial dividing walls between the two concentric dividing walls, the number of radial dividing walls between the outermost concentric dividing wall and the outer periphery of the flow guide being equal to the number of radial dividing walls between the two concentric dividing walls. This produces a distribution of throughflow apertures in which the size of the throughflow apertures is always approximately the same, so that as a result the eddies in the gas flow are eliminated already over a short length in the axial direction. The central part can comprise a throughflow aperture, but can also be closed and, for example, serve as an attachment point for fixing means.

The radial dividing walls between the two concentric dividing walls preferably always lie in line with the radial dividing walls between the outermost concentric dividing wall and the outer periphery of the flow guide, while the radial dividing walls between the central part and the innermost concentric dividing wall always lie in line with a pair of radial dividing walls between the innermost concentric dividing wall and the outer periphery of the flow guide. This makes the flow guide easy to manufacture by means of, for example, injection moulding. A mould can be manufactured relatively cheaply for the purpose.

In another preferred embodiment, which is suitable in particular for use in pipes with larger internal diameters, the flow guide comprises a substantially circular central part with a diameter which is approximately one fifth of the diameter of the outer periphery of the flow guide, the flow guide further comprising three concentric dividing walls, the number of radial dividing walls between the outer periphery of the flow guide and the outermost concentric dividing wall being three times the number of radial dividing walls between the central part and the innermost concentric dividing wall, and the number of radial dividing walls between two adjacent concentric dividing walls being twice the number of radial dividing walls between the central part and the innermost concentric dividing wall.

The object of the invention is also achieved with a device for measuring the flow rate of a gas flow in a pipe, consisting of a turbine wheel gas meter to be placed in the pipe and a flow guide which is placed upstream relative to the turbine wheel gas meter, at a distance from the turbine wheel gas meter, at the side facing the flow guide the turbine wheel gas meter being provided with a blunt, rounded nose part, and the flow guide consisting of a number of uniformly distributed concentric dividing walls and a number of uniformly distributed radial dividing walls. Eddies in the gas flow are eliminated by the flow guide at low pressures. After passing through the flow guide, the gas flow is directed by radial impulse exchange in the space between the nose part and the flow guide in such a way that the flow profile is homogeneous in the annular gap between the turbine wheel gas meter and the inside wall of the pipe.

BRIEF DESCRIPTION

The invention will be explained in greater detail with reference to the drawing, in which:

FIG. 2 shows in front view the flow guide according to the invention;

FIG. 3 shows in rear view the flow guide according to FIG. 2; and

FIG. 4 shows in front view another possible flow guide according to the invention.

DETAILED DESCRIPTION

Figure 1:
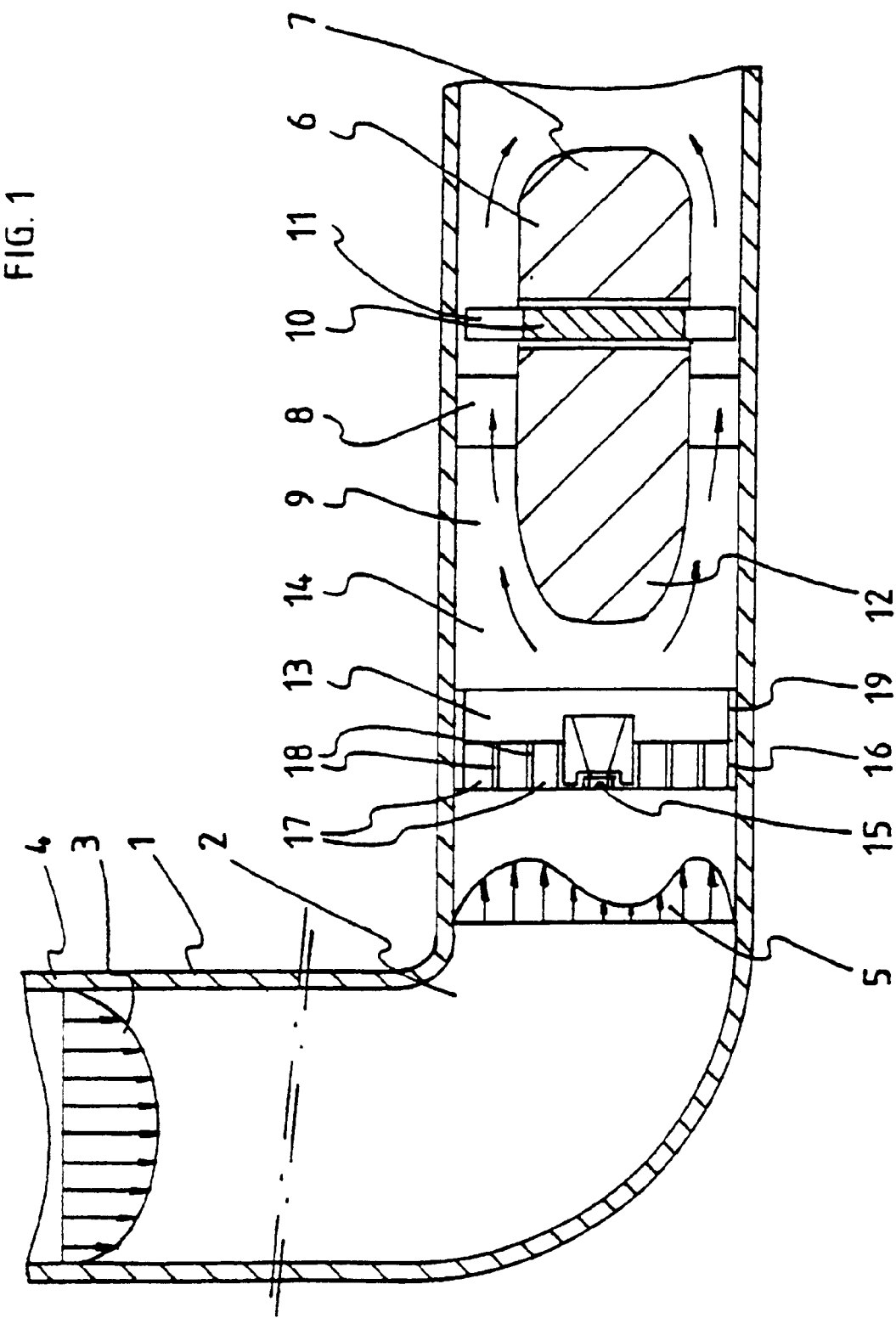
FIG. 1 shows in cross-section the device according to the invention.

FIG. 1 shows in cross-section a pipe 1 with a bend 2. A gas flows through the cross pipe. If the gas is flowing through a very long pipe with continuous diameter, a flow profile 3, in which the gas flows faster in the center than near the wall 4 of the pipe 1, is obtained. Said flow profile is disturbed by obstacles in the gas pipe, for example bends, narrowings or fittings, in which case eddies are caused in the gas flow. After passing through the bend 2, the gas flow has a flow profile 5. A turbine wheel gas meter 6 is placed in the pipe 1, in order to measure the flow rate of the gas flow. The turbine wheel gas meter 6 consists of a substantially cylindrical element 7, which is suspended in the pipe 1 concentrically by means of radial spokes 8, between the inside wall of the pipe 1 and the cylindrical element of the turbine wheel gas meter 6 an annular gap 9 remaining open, through which gap the gas flows. A rotatable blade wheel 10 is accommodated in the turbine wheel gas meter 6, the blades 11 of which blade wheel are placed in the annular gap 9. The blade wheel 10 is set in motion by the gas flowing through the annular gap 9. The flow rate of the gas flow through the annular gap 9 can be calculated by measuring the speed of rotation of the blade wheel 10. For this purpose, the flow in the annular gap 9 must be uniform, and the gas flow must not have any eddies. If the gas flowed with a non-uniform flow profile through the annular gap 9, in which case, for example, more gas would flow at one side than at the other side of the blade wheel 10, this would lead to measuring errors.

In order to ensure that the gas flow flows with a uniform flow profile through the annular gap, the turbine wheel gas meter 6 at the upstream end is provided with a blunt, rounded nose part 12, a flow guide 13 being placed at a distance upstream of the nose part 12. The flow guide 13 eliminates eddies in the gas flow. After the gas flow has passed through the flow guide 13, the flow profile thereof is free from eddies, but still not uniform. In the space 14 between the flow guide 13 and the nose part 12 the gas flow is further homogenized by radial impulse exchange. To this end, the shape of the nose part 12 is blunt in shape and is not streamlined. The flow guide 13 comprises a closed circular central part 15 and a cylindrical outside wall 16 which is placed in a well-fitting manner in the pipe 1. The space between the central part 15 and the outside wall 16 is divided up by radial dividing walls 17 and concentric dividing walls 18. The outermost wall 16 extends in the axial direction over a certain length into an extension 19. This cylindrical extension 19 serves for fixing the flow guide 13 to the inside wall of the pipe 1.

FIGS. 2 and 3 show in succession the flow guide 13 in front and rear view respectively. The flow guide 13 comprises the closed central part 15, two concentric dividing walls 18 and cylindrical outside wall 16. The central part 15 is substantially circular. The diameter of the central part 15 is approximately one quarter of the periphery of the flow guide 13. The distance between the concentric dividing walls 18 is equal to the distance between the innermost concentric wall and the central part 15 and is also equal to the distance between the outermost concentric dividing wall 18 and the outside wall 16. Ten uniformly distributed radial dividing walls 17 are situated between the central part 15 and the innermost concentric dividing wall 18. Between the concentric dividing walls 18 there are twenty uniformly distributed radial dividing walls 17, and also between the outermost concentric dividing wall and the outside wall 16. The radial dividing walls 17 between the two concentric dividing walls 18 always lie in line with the radial dividing walls 17 between the outermost concentric dividing wall 18 and the outside wall 16, while the radial dividing walls 17 between the central part 15 and the innermost concentric dividing wall 18 always lie in line with a pair of radial dividing walls 17 between the innermost concentric dividing wall 18 and the outside wall 16. The radial and concentric dividing walls 17, 18 thus bound more or less equal sizes of throughflow apertures 20. At the front side of the closed central part 15 the dividing walls 17 extend slightly into radial extensions 21, tapering towards the center of the central part 15. This means that an advantageous mould construction can be obtained.

FIG. 4 shows a flow guide 22 for larger pipe diameters. This flow guide 22 is designed with a substantially circular central part 15 with a diameter which is approximately one fifth of the diameter of the outside wall 16. The flow guide 22 further comprises three concentric dividing walls 18, the number of radial dividing walls 17 between the outside wall 16 and the outermost concentric dividing wall 18 being three times the number of radial dividing walls 17 between the central part 15 and the innermost concentric dividing wall 18. The number of radial dividing walls 17 between two adjacent concentric dividing walls 18 is twice the number of the radial dividing walls 17 between the central part 15 and the innermost concentric dividing wall 18, so that a relatively fine-mesh network of more or less equal and uniformly distributed throughflow apertures is obtained.

What is claimed is:

1. A device for measuring a flow rate of a gas flowing in one direction through a pipe, said device comprising a turbine wheel gas meter adapted to be placed in the pipe and a flow guide having a plurality of throughflow apertures adapted to be placed in the pipe at a distance upstream relative to the turbine wheel gas meter, said turbine wheel gas meter having a side facing the flow guide which includes a blunt, rounded nose part, said distance being such to provide a space between the flow guide and the turbine wheel gas meter for homogenizing gas flow by radial pulse exchange between the flow guide and said nose part, said flow guide comprising at least one dividing wall which is substantially concentric with an inside surface of a wall of the pipe, a number of uniformly distributed radial dividing walls extending on both sides of said at least concentric dividing wall, said at least one concentric wall and said radial dividing wall defining said throughflow apertures in said flow guide to constitute at least 80% of a cross sectional area of the pipe.

2. A device according to claim 1, wherein said flow guide includes an outermost concentric wall having a diameter substantially the same as the inside surface of the wall of the pipe.

3. A device according to claim 2, wherein said outermost concentric wall has a length in an axial direction of the pipe which is greater than an axial length of said radial and concentric dividing walls.

4. A device according to claim 1, wherein said flow guide comprises a substantially circular central part having a diameter approximately one quarter of an outer diameter of the flow guide, and two said concentric dividing walls are provided separated by a radial distance approximately equal to a distance between an innermost one of said concentric walls and said central part and also approximately equal to a distance between and outermost one of said concentric dividing walls and the outer diameter of the flow guide.

5. A device according to claim 4, wherein the number of said radial dividing walls between the central part and the innermost concentric wall are one-half the number of radial dividing walls between the two concentric dividing walls and one-half the number of radial dividing walls between the outermost concentric dividing wall and the outer diameter of the flow guide.

6. A device according to claim 5, wherein the radial dividing walls between the two concentric dividing walls always lie in line with the radial dividing walls between the outermost concentric dividing wall and the outer diameter of the flow guide, while the radial dividing walls between the central part and the innermost concentric dividing wall always lie in line with a pair of radial dividing walls between the innermost concentric dividing wall and the outer diameter of the flow guide.

7. A device according to claim 5, wherein the central part of the flow guide has a throughflow aperture.

8. A device according to claim 1, wherein the flow guide comprises a substantially circular central part with a diameter which is approximately one fifth of the outer diameter of the flow guide, the flow guide further comprising three said concentric dividing walls, the number of radial dividing walls between the outer periphery of the flow guide and an outermost concentric dividing wall being three times the number of radial dividing walls between the central part and an innermost one of said concentric dividing walls, the number of radial dividing walls between two adjacent concentric dividing walls being twice the number of radial dividing walls between the central part and said innermost concentric dividing wall.

9. A device according to claim 1, wherein said concentric and radial dividing walls are arranged so that said flow apertures have substantially equalized quadrangular areas throughout said flow guide.

10. A device according to claim 9, wherein said flow apertures are arranged in a plurality of circumferential rows in said flow guide.

* * * * *